United States Patent
Bitterfeld et al.

(10) Patent No.: US 10,771,344 B2
(45) Date of Patent: Sep. 8, 2020

(54) DISCOVERY OF HYPER-CONVERGED INFRASTRUCTURE DEVICES

(71) Applicant: ServiceNow, Inc., Santa Clara, CA (US)

(72) Inventors: Robert Bitterfeld, Petach Tikva (IL); Boris Erblat, Tel Aviv (IL); Aviya Aron, Shafir (IL); Bary Solomon, Petah Tikva (IL); Daniel Badyan, Tel Aviv (IL)

(73) Assignee: ServiceNow, Inc., Santa Clara, CA (US)

( * ) Notice: Subject to any disclaimer, the term of this patent is extended or adjusted under 35 U.S.C. 154(b) by 74 days.

(21) Appl. No.: 16/230,661

(22) Filed: Dec. 21, 2018

(65) Prior Publication Data

US 2020/0204449 A1 Jun. 25, 2020

(51) Int. Cl.
*G06F 15/173* (2006.01)
*H04L 12/24* (2006.01)
*H04L 29/08* (2006.01)
*G06F 16/23* (2019.01)

(52) U.S. Cl.
CPC .......... *H04L 41/12* (2013.01); *G06F 16/2379* (2019.01); *H04L 67/28* (2013.01); *H04L 67/1097* (2013.01)

(58) Field of Classification Search
USPC ........................................................ 709/226
See application file for complete search history.

(56) References Cited

U.S. PATENT DOCUMENTS

| 5,978,594 | A  | 11/1999 | Bonnell   |
| 6,321,229 | B1 | 11/2001 | Goldman   |
| 6,799,189 | B2 | 9/2004  | Huxoll    |
| 6,816,898 | B1 | 11/2004 | Scarpelli |
| 6,895,586 | B1 | 5/2005  | Brasher   |

(Continued)

FOREIGN PATENT DOCUMENTS

WO 2008/151925 A2 12/2008

OTHER PUBLICATIONS

International Search Report & Written Opinion for PCT Application No. PCT/US2019/067636 dated Mar. 23, 2020; 15 pgs.

*Primary Examiner* — Alicia Baturay
(74) *Attorney, Agent, or Firm* — Fletcher Yoder PC

(57) ABSTRACT

A system may include a database, where a managed network includes a computing cluster that provides networking, storage, and virtualization services distributed across a plurality of computing devices, where each computing device can execute one or more respective software applications and comprises: (i) a respective controller, and (ii) a respective storage device, and where the storage devices of the plurality of computing devices collectively form a storage pool. The system may also include a proxy server application configured to: request and receive computing cluster data that identifies the computing cluster; request and receive storage pool data that identifies the storage pool; request and receive storage container data that identifies storage containers of the storage pool; request and receive controller data that identifies the controllers of the plurality computing devices; and provide, to the database, the computing cluster data, the storage pool data, the storage container data, and the controller data.

20 Claims, 13 Drawing Sheets

(56) References Cited

U.S. PATENT DOCUMENTS

| | | |
|---|---|---|
| 7,020,706 B2 | 3/2006 | Cates |
| 7,027,411 B1 | 4/2006 | Pulsipher |
| 7,392,300 B2 | 6/2008 | Anantharangachar |
| 7,617,073 B2 | 11/2009 | Trinon |
| 7,685,167 B2 | 3/2010 | Mueller |
| 7,716,353 B2 | 5/2010 | Golovinsky |
| 7,769,718 B2 | 8/2010 | Murley |
| 7,877,783 B1 | 1/2011 | Cline |
| 7,925,981 B2 | 4/2011 | Pourheidari |
| 7,933,927 B2 | 4/2011 | Dee |
| 7,941,506 B2 | 5/2011 | Bonal |
| 7,945,860 B2 | 5/2011 | Vambanepe |
| 8,082,222 B2 | 12/2011 | Rangarajan |
| 8,346,752 B2 | 1/2013 | Sirota |
| 8,380,645 B2 | 2/2013 | Kowalski |
| 8,402,127 B2 | 3/2013 | Solin |
| 8,554,750 B2 | 10/2013 | Rangaranjan |
| 8,612,408 B2 | 12/2013 | Trinon |
| 8,646,093 B2 | 2/2014 | Myers |
| 8,683,032 B2 | 3/2014 | Spinelli |
| 8,745,040 B2 | 6/2014 | Kowalski |
| 8,812,539 B2 | 8/2014 | Milousheff |
| 8,818,994 B2 | 8/2014 | Kowalski |
| 8,832,652 B2 | 9/2014 | Mueller |
| 8,907,988 B2 | 12/2014 | Poston |
| 9,015,188 B2 | 4/2015 | Behne |
| 9,037,536 B2 | 5/2015 | Vos |
| 9,065,783 B2 | 6/2015 | Ding |
| 9,098,322 B2 | 8/2015 | Apte |
| 9,122,552 B2 | 9/2015 | Whitney |
| 9,137,115 B2 | 9/2015 | Mayfield |
| 9,261,372 B2 | 2/2016 | Cline |
| 9,313,281 B1 | 4/2016 | Lietz et al. |
| 9,317,327 B2 | 4/2016 | Apte |
| 9,323,801 B2 | 4/2016 | Morozov |
| 9,363,252 B2 | 6/2016 | Mueller |
| 9,412,084 B2 | 9/2016 | Kowalski |
| 9,467,344 B2 | 10/2016 | Gere |
| 9,534,903 B2 | 1/2017 | Cline |
| 9,535,737 B2 | 1/2017 | Joy |
| 9,613,070 B2 | 4/2017 | Kumar |
| 9,626,211 B2 * | 4/2017 | Riewrangboonya ............... G06F 9/45558 |
| 9,631,934 B2 | 4/2017 | Cline |
| 9,645,833 B2 | 5/2017 | Mueller |
| 9,654,473 B2 | 5/2017 | Miller |
| 9,659,051 B2 | 5/2017 | Hutchins |
| 9,665,235 B2 * | 5/2017 | Van Der Walt ....... G06F 3/0481 |
| 9,766,935 B2 | 9/2017 | Kelkar |
| 9,778,865 B1 * | 10/2017 | Srinivasan ............ G06F 3/0619 |
| 9,792,387 B2 | 10/2017 | George |
| 9,805,322 B2 | 10/2017 | Kelkar |
| 9,817,584 B2 | 11/2017 | Chen et al. |
| 9,830,082 B1 * | 11/2017 | Srinivasan ............. G06F 3/065 |
| 9,852,165 B2 | 12/2017 | Morozov |
| 9,967,162 B2 | 5/2018 | Spinelli |
| 9,996,375 B2 * | 6/2018 | Riewrangboonya ............... G06F 9/45558 |
| 10,002,203 B2 | 6/2018 | George |
| 10,078,465 B1 * | 9/2018 | Wu ...................... G06F 3/061 |
| 10,108,560 B1 * | 10/2018 | Lamb .................. G06F 3/0607 |
| 10,169,064 B2 * | 1/2019 | Riewrangboonya ............... G06F 9/45558 |
| 10,284,642 B2 * | 5/2019 | Shanley ............. H04L 67/1061 |
| 10,372,464 B2 * | 8/2019 | Devireddy ............ G06F 9/4416 |
| 10,379,771 B1 * | 8/2019 | Wu ...................... G06F 3/067 |
| 10,389,589 B2 * | 8/2019 | Grisco .................... H04L 41/22 |
| 10,402,217 B2 * | 9/2019 | Shanley ............... G06F 9/45533 |
| 10,425,292 B2 * | 9/2019 | Biran ..................... H04L 41/28 |
| 10,445,143 B2 * | 10/2019 | Gakhar ................ G06F 9/5083 |
| 10,459,594 B2 * | 10/2019 | Van Der Walt ........ H04L 41/50 |
| 10,462,221 B2 * | 10/2019 | Siddappa ............ H04L 67/1012 |
| 10,474,508 B2 * | 11/2019 | Selvaraj ............. G06F 11/1464 |
| 10,476,951 B2 * | 11/2019 | Gakhar ................ H04L 43/0817 |
| 10,491,662 B2 * | 11/2019 | Srikanth ............... G06F 9/5027 |
| 10,491,692 B1 * | 11/2019 | Feiguine .............. H04L 67/16 |
| 10,496,447 B2 * | 12/2019 | Devireddy ............ G06F 9/4416 |
| 10,540,212 B2 * | 1/2020 | Feng .................... G06F 9/5077 |
| 10,574,580 B2 * | 2/2020 | Nayak ................. H04L 43/0882 |
| 10,585,775 B2 * | 3/2020 | Desai ................... G06K 9/6223 |
| 10,620,999 B2 * | 4/2020 | Devireddy ............ G06F 9/5044 |
| 2008/0243900 A1 | 10/2008 | Yohanan et al. |
| 2012/0198073 A1 | 8/2012 | Srikanth et al. |
| 2016/0055579 A1 * | 2/2016 | McDonough ....... G06F 11/3688 705/37 |
| 2018/0145955 A1 * | 5/2018 | Nirwal ................. H04L 9/0894 |
| 2018/0324045 A1 | 11/2018 | Grisco et al. |
| 2019/0007369 A1 * | 1/2019 | Nirwal .................. H04L 61/103 |
| 2019/0018700 A1 * | 1/2019 | Antony ............... G06F 9/452 |
| 2019/0026140 A1 * | 1/2019 | Mahajan ................ G06F 8/71 |
| 2019/0026141 A1 * | 1/2019 | Mahajan ................ G06F 8/71 |
| 2019/0026162 A1 * | 1/2019 | Mahajan ............... G06F 9/505 |
| 2019/0068698 A1 * | 2/2019 | Kumar ................ H04L 63/0428 |
| 2019/0171475 A1 * | 6/2019 | Riewrangboonya ............... H04L 41/0813 |
| 2019/0235764 A1 * | 8/2019 | Lan ....................... G06F 3/0689 |
| 2019/0294463 A1 * | 9/2019 | Mukhopadhyay ........ G06F 8/65 |
| 2019/0296972 A1 * | 9/2019 | Brotherson ......... H04L 41/0853 |
| 2019/0334787 A1 * | 10/2019 | Kelly .................... H04L 41/22 |
| 2019/0391831 A1 * | 12/2019 | Yang .................. G06F 9/45558 |
| 2020/0019841 A1 * | 1/2020 | Shaabana ............... G06F 9/505 |
| 2020/0028764 A1 * | 1/2020 | Zhang ................ G06F 9/45558 |
| 2020/0034459 A1 * | 1/2020 | Rabe .................... G06F 16/273 |
| 2020/0036791 A1 * | 1/2020 | Siddappa ............. H04L 67/1012 |
| 2020/0092359 A1 * | 3/2020 | Gakhar ................ H04L 43/0817 |

\* cited by examiner

DISCOVERY OF HYPER-CONVERGED INFRASTRUCTURE DEVICES

BACKGROUND

A computer network may include various interconnected computing devices and software applications, each of which may be represented by one or more configuration items. Managing the network may involve discovering and keeping track of the configuration items. Additionally, managing the network may involve organizing the configuration items into a representation or map that allows the state of the network to be visualized. Visualization, in turn, allows the network and its contents to be adjusted to meet various needs of an enterprise.

SUMMARY

A remote network management platform may seek to discover and map configuration items of a managed network. However, the managed network may include different types of configuration items. Discovery and mapping of these configurations items, such as devices, applications, and the relationships therebetween, may involve using discovery patterns. These discovery patterns may define rules and sequences of operations to be carried out by a discovery application to detect, classify, and gather information regarding the configuration items within the managed network.

One type of configuration item that may be deployed within the managed network is a computing cluster whose nodes implement a hyper-converged infrastructure (HCI). The nodes may be a plurality of servers that are communicatively coupled to one another and that are configured to provide virtualization, storage, and networking services to the managed network. The computing cluster may include different types of configuration items that allow the cluster to offer such services. For example, the virtualization services may be facilitated by virtual machines executed by the plurality of servers and the storage services may be facilitated by storage devices of the plurality of servers. It may be desirable to discover and map the configuration items of the computing cluster in order to properly utilize the capabilities of the computing cluster.

Disclosed herein is a discovery pattern for devices or systems that implement an HCI, such as a computing cluster. The discovery pattern may characterize the configuration items of the computing cluster, including the servers of the cluster, the applications being executed by the servers, and the storage devices of the cluster. Additionally, the discovery pattern may also map the computing cluster by establishing relationships between the discovered configuration items of the cluster.

Information indicative of the discovered configuration items and/or the relationships therebetween may be stored in a database of the remote network management platform. This information may be used to determine a status of the server cluster (e.g., operational status, configuration, and/or property of the server cluster and/or a component thereof). Additionally and/or alternatively, a graphical user interface that depicts the mapping of the server cluster may be provided to a user, perhaps so that the user may quickly determine the status of the cluster.

Accordingly, a first example embodiment may involve requesting and receiving, from a first controller and by a proxy server application, computing cluster data that identifies a computing cluster. The first controller is associated with one of a plurality of computing devices of the computing cluster, and the computing cluster and the proxy server application are disposed within a managed network. The computing cluster provides networking, storage, and virtualization services distributed across the plurality of computing devices, the plurality of computing devices are communicatively coupled via a local-area network, and each computing device is configured to execute one or more respective software applications and comprises: (i) a respective controller, and (ii) a respective storage device. The method further includes requesting and receiving, from the first controller and by the proxy server application, storage pool data that identifies a storage pool of the computing cluster, where the storage pool is provided by the storage devices of the plurality of computing devices. The method also includes requesting and receiving, from the first controller and by the proxy server application, storage container data that identifies storage containers of the storage pool, where a storage container includes a subset of available storage in the storage pool. Further, the method includes requesting and receiving, from the first controller and by the proxy server application, controller data that identifies the controllers of the plurality computing devices. Yet further, the method includes providing, to a database disposed within a remote network management platform and by the proxy server application, the computing cluster data, the storage pool data, the storage container data, and the controller data.

In a second example embodiment, an article of manufacture may include a non-transitory computer-readable medium, having stored thereon program instructions that, upon execution by a computing system, cause the computing system to perform operations in accordance with the first example embodiment.

In a third example embodiment, a computing system may include at least one processor, as well as memory and program instructions. The program instructions may be stored in the memory, and upon execution by the at least one processor, cause the computing system to perform operations in accordance with the first example embodiment.

In a fourth example embodiment, a system may include various means for carrying out each of the operations of the first example embodiment.

These as well as other embodiments, aspects, advantages, and alternatives will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
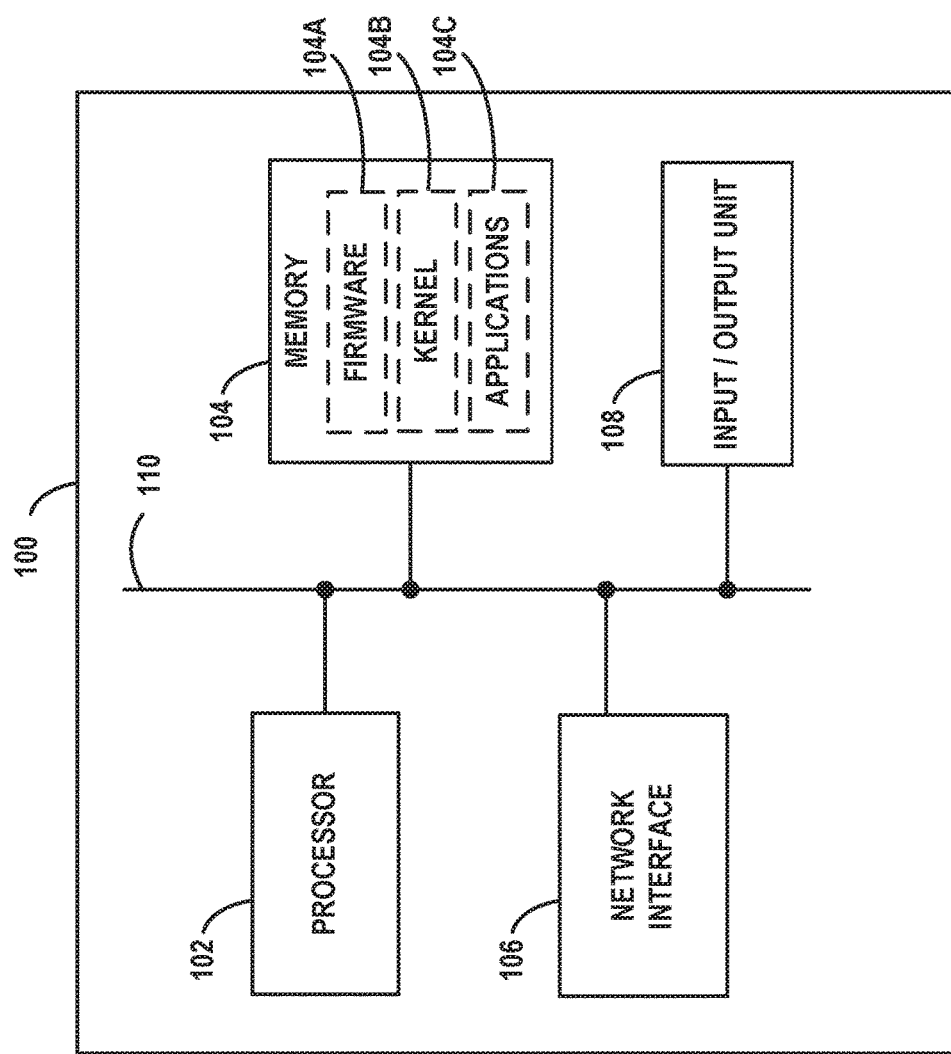
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. INTRODUCTION

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data is stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. EXAMPLE COMPUTING DEVICES AND CLOUD-BASED COMPUTING ENVIRONMENTS

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
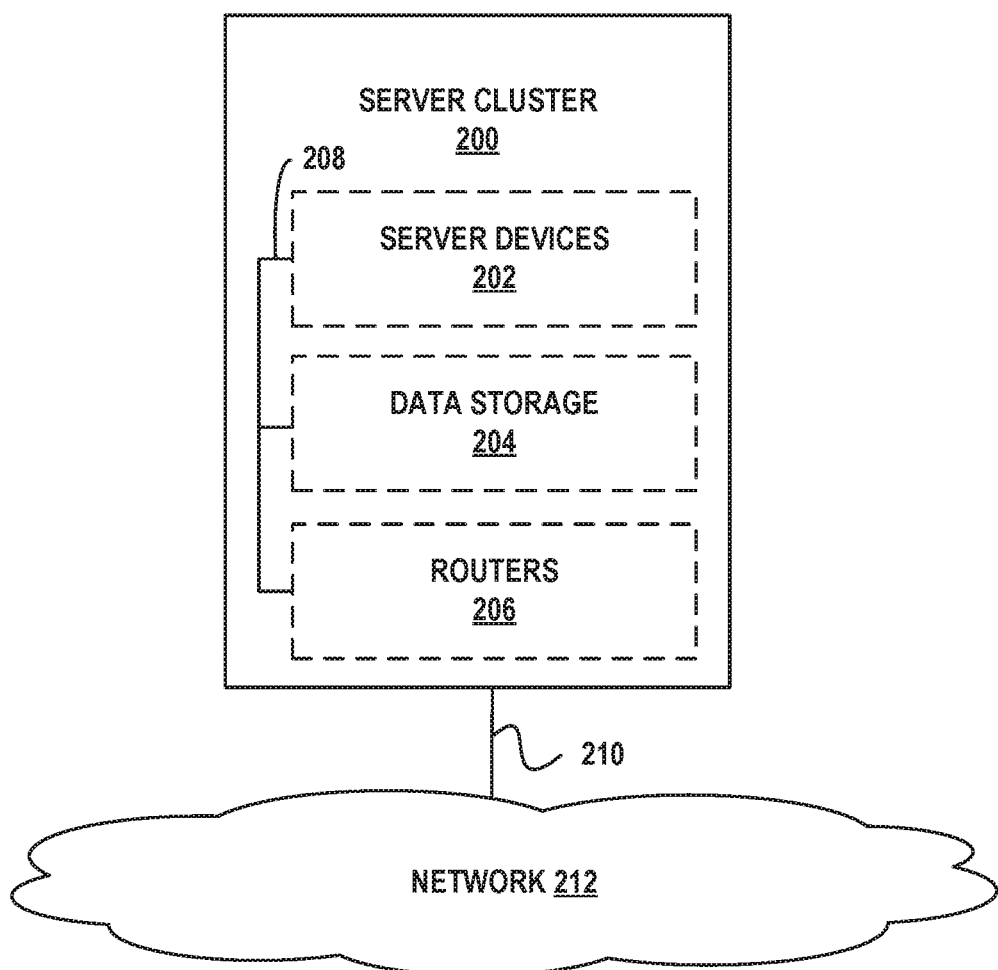
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between the server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JavaScript, and so on. Computer program code written in these languages may facilitate the providing of web pages to client devices, as well as client device interaction with the web pages.

III. EXAMPLE REMOTE NETWORK MANAGEMENT ARCHITECTURE

Figure 3:
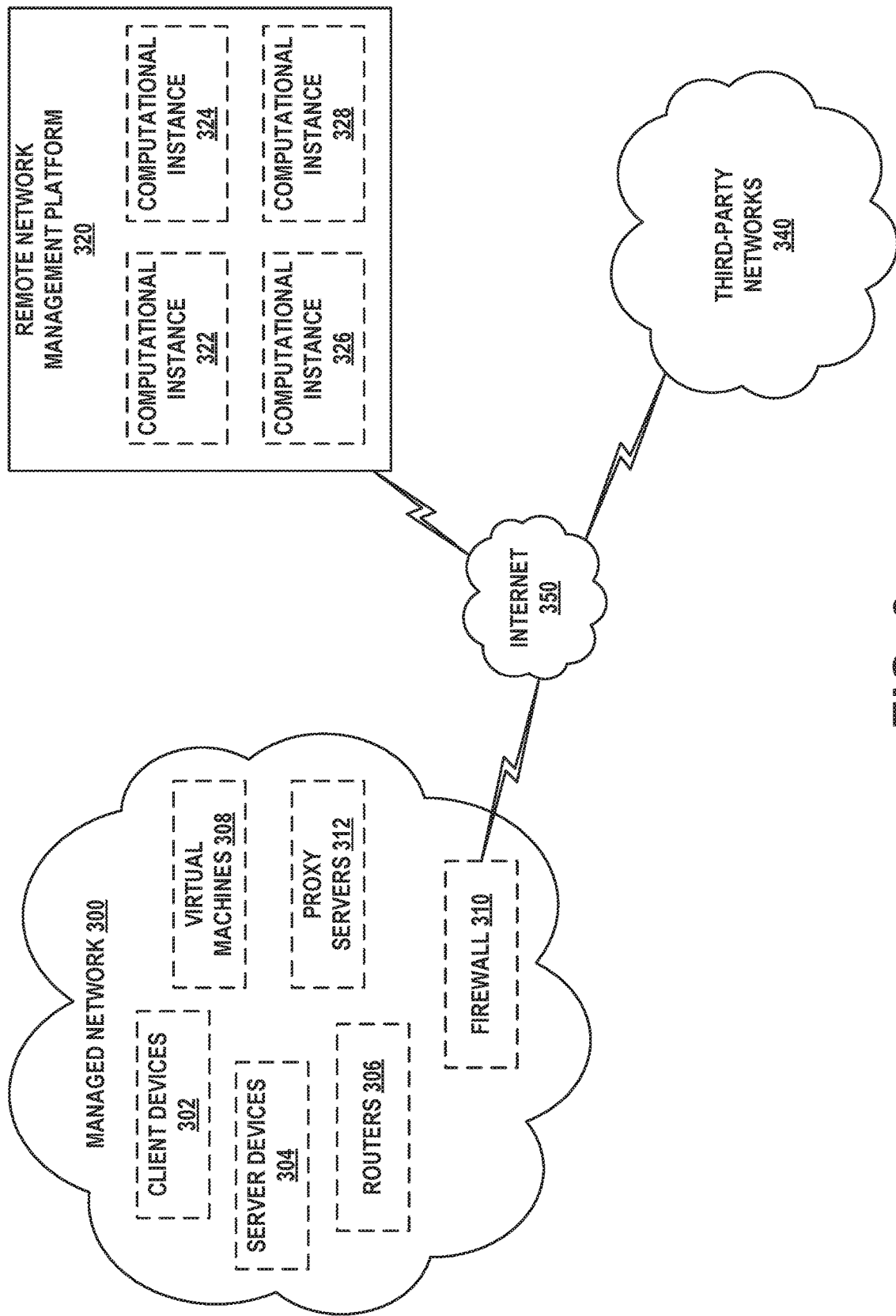
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by an entity for computing and communications tasks, as well as storage of data. Thus, managed network 300 may include various client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these instances may represent one or more server devices and/or one or more databases that provide a set of web portals, services, and applications (e.g., a wholly-functioning aPaaS system) available to a particular customer. In some cases, a single customer may use multiple computational instances. For example, managed network 300 may be an enterprise customer of remote network management platform 320, and may use computational instances 322, 324, and 326. The reason for providing multiple instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows with one or more database tables).

For purpose of clarity, the disclosure herein refers to the physical hardware, software, and arrangement thereof as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures have several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of physical or virtual servers and database devices. Such a central instance may serve as a repository for data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® Azure. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
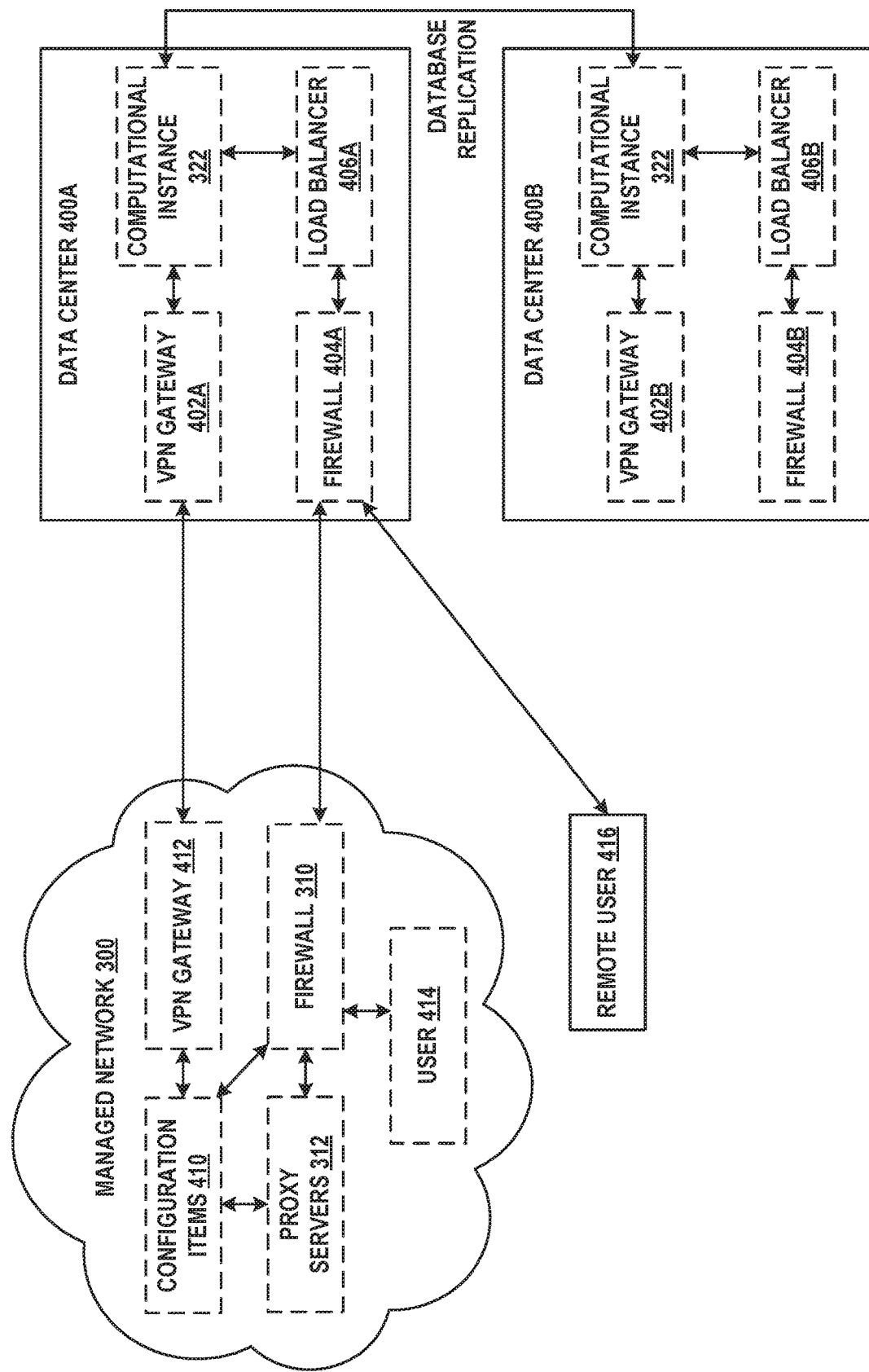
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. EXAMPLE DEVICE, APPLICATION, AND SERVICE DISCOVERY

In order for remote network management platform 320 to administer the devices, applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
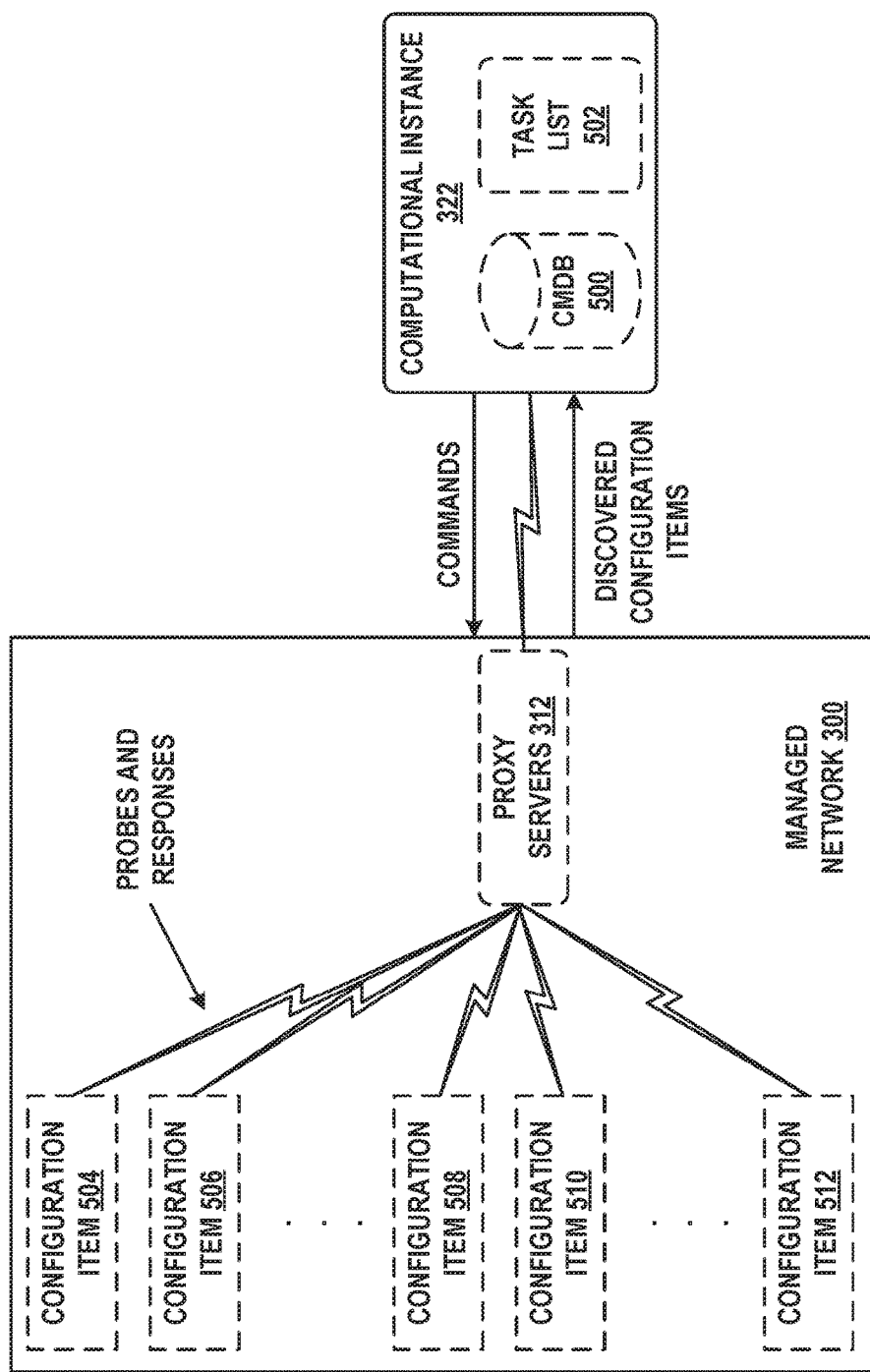
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
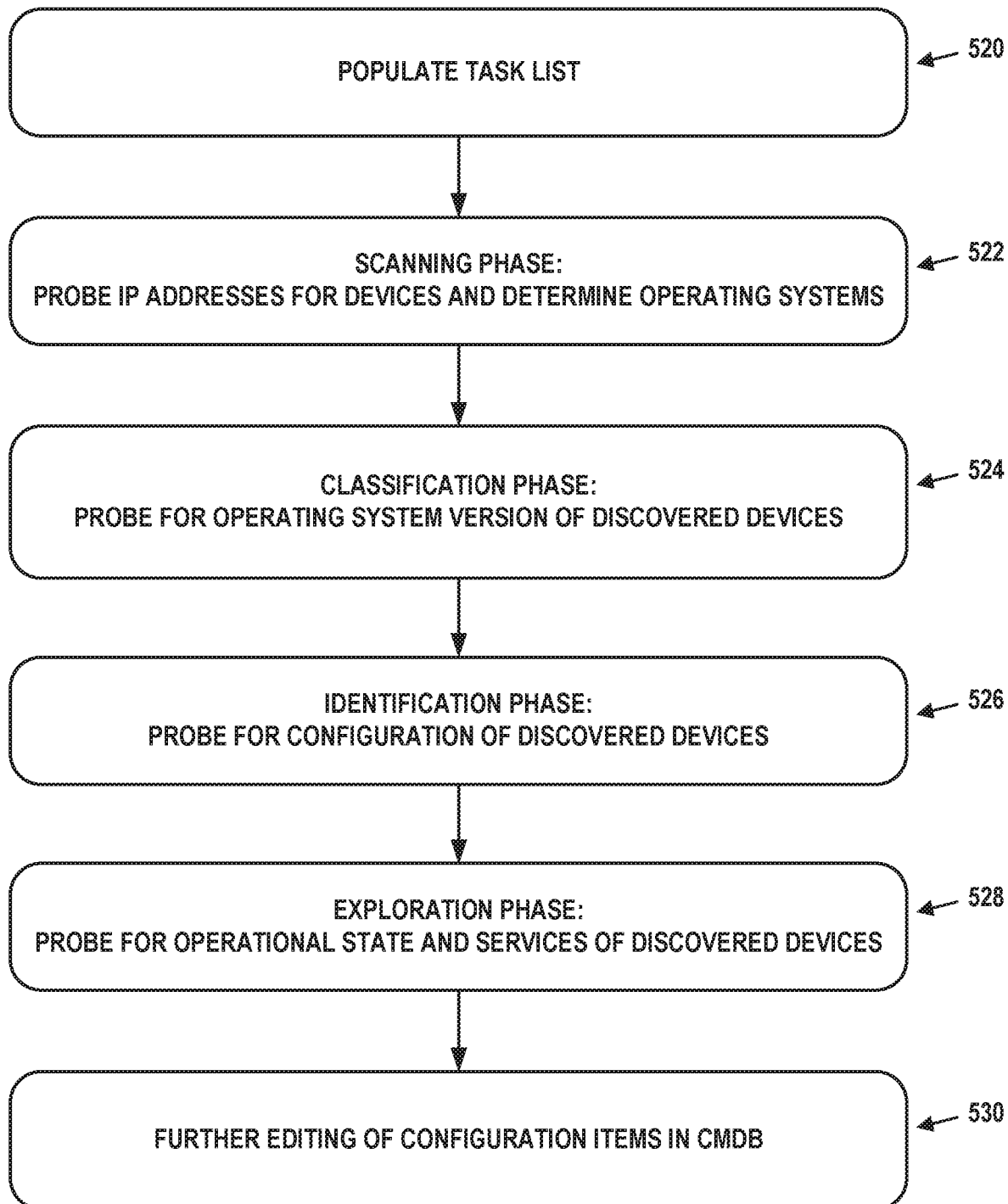
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. CMDB IDENTIFICATION RULES AND RECONCILIATION

A CMDB, such as CMDB 500, provides a repository of configuration items, and when properly provisioned, can take on a key role in higher-layer applications deployed within or involving a computational instance. These applications may relate to enterprise IT service management, operations management, asset management, configuration management, compliance, and so on.

For example, an IT service management application may use information in the CMDB to determine applications and services that may be impacted by a component (e.g., a server device) that has malfunctioned, crashed, or is heavily loaded. Likewise, an asset management application may use information in the CMDB to determine which hardware and/or software components are being used to support particular enterprise applications. As a consequence of the importance of the CMDB, it is desirable for the information stored therein to be accurate, consistent, and up to date.

A CMDB may be populated in various ways. As discussed above, a discovery procedure may automatically store information related to configuration items in the CMDB. However, a CMDB can also be populated, as a whole or in part, by manual entry, configuration files, and third-party data sources. Given that multiple data sources may be able to update the CMDB at any time, it is possible that one data source may overwrite entries of another data source. Also, two data sources may each create slightly different entries for the same configuration item, resulting in a CMDB containing duplicate data. When either of these occurrences takes place, they can cause the health and utility of the CMDB to be reduced.

In order to mitigate this situation, these data sources might not write configuration items directly to the CMDB. Instead, they may write to an identification and reconciliation application programming interface (API). This API may use a set of configurable identification rules that can be used to uniquely identify configuration items and determine whether and how they are written to the CMDB.

In general, an identification rule specifies a set of configuration item attributes that can be used for this unique identification. Identification rules may also have priorities so that rules with higher priorities are considered before rules with lower priorities. Additionally, a rule may be independent, in that the rule identifies configuration items independently of other configuration items. Alternatively, the rule may be dependent, in that the rule first uses a metadata rule to identify a dependent configuration item.

Metadata rules describe which other configuration items are contained within a particular configuration item, or the host on which a particular configuration item is deployed. For example, a network directory service configuration item may contain a domain controller configuration item, while a web server application configuration item may be hosted on a server device configuration item.

A goal of each identification rule is to use a combination of attributes that can unambiguously distinguish a configuration item from all other configuration items, and is expected not to change during the lifetime of the configuration item. Some possible attributes for an example server device may include serial number, location, operating system, operating system version, memory capacity, and so on. If a rule specifies attributes that do not uniquely identify the configuration item, then multiple components may be represented as the same configuration item in the CMDB. Also, if a rule specifies attributes that change for a particular configuration item, duplicate configuration items may be created.

Thus, when a data source provides information regarding a configuration item to the identification and reconciliation API, the API may attempt to match the information with one or more rules. If a match is found, the configuration item is written to the CMDB. If a match is not found, the configuration item may be held for further analysis.

Configuration item reconciliation procedures may be used to ensure that only authoritative data sources are allowed to overwrite configuration item data in the CMDB. This reconciliation may also be rules-based. For instance, a reconciliation rule may specify that a particular data source is authoritative for a particular configuration item type and set of attributes. Then, the identification and reconciliation API will only permit this authoritative data source to write to the particular configuration item, and writes from unauthorized data sources may be prevented. Thus, the authorized data source becomes the single source of truth regarding the particular configuration item. In some cases, an unauthorized data source may be allowed to write to a configuration item if it is creating the configuration item or the attributes to which it is writing are empty.

Additionally, multiple data sources may be authoritative for the same configuration item or attributes thereof. To avoid ambiguities, these data sources may be assigned precedences that are taken into account during the writing of configuration items. For example, a secondary authorized data source may be able to write to a configuration item's attribute until a primary authorized data source writes to this attribute. Afterward, further writes to the attribute by the secondary authorized data source may be prevented.

In some cases, duplicate configuration items may be automatically detected by reconciliation procedures or in another fashion. These configuration items may be flagged for manual de-duplication.

VI. ILLUSTRATIVE SERVER CLUSTER

In line with the discussion above, the managed network 300 may include a device (e.g., a server) that may implement a full-stack infrastructure that integrates computation, virtualization, storage, and networking capabilities. In an example, the infrastructure that achieves such integration may be known as a hyper-converged infrastructure (HCI). HCI is a software-defined mechanism that virtualizes one or more elements of a traditional hardware system. Generally, an HCI server may deliver virtualized computing (e.g., by way of a hypervisor), virtualized software-defined storage, and virtualized networking (e.g., software-defined networking). The benefits of such a system, e.g., over a more traditional three-tiered hardware system, include simplicity, scalability, and cost-effectiveness.

In an embodiment, a plurality of the servers may be arranged to form a server cluster, perhaps by communicatively coupling the servers via a network. Each server may serve as a node of the server cluster and may provide computation, virtualization, storage, and networking capabilities. The server cluster may be configured to distribute operating functions across the plurality of servers for purposes of performance and resilience. Furthermore, in this arrangement, the server cluster may be scaled to integrate additional nodes up to an unlimited number of nodes.

Figure 6:
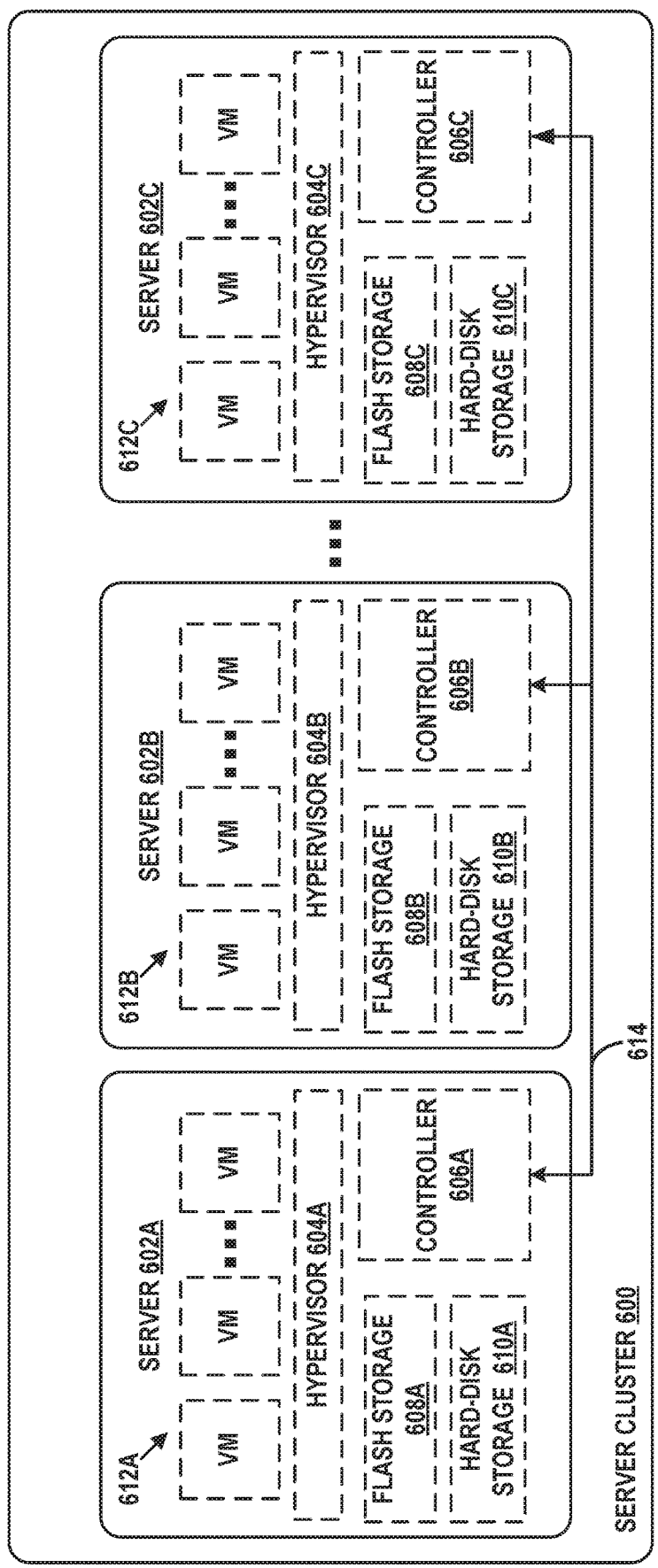
FIG. 6 is a computing cluster, in accordance with example embodiments.

FIG. 6 illustrates a server cluster 600, according to an example embodiment. The server cluster 600 may include a plurality of servers, which include identical or different types of servers, such as an x86 based server. Furthermore, the servers may be communicatively coupled to one another, perhaps via a local-area network (LAN) 614. In the example shown in FIG. 6, the server cluster 600 includes three servers 602A, 602B, and 602C. In other examples, the server cluster 600 may include fewer than or more than three servers.

In an embodiment, the servers 602A, 602B, 602C may each include a hypervisor that executes one or more virtual machines, local storage in the form of flash storage device(s) and/or hard-disk storage device(s), and a controller (also referred to herein as a "controller virtual machine (CVM)" or "an application controller"). As shown in FIG. 6, server 602A may include hypervisor 604A, controller 606A, flash storage 608A, and hard-disk storage 610A; server 602B may include hypervisor 604B, controller 606B, flash storage 608B, and hard-disk storage 610B; and server 602C may include hypervisor 604C, controller 606C, flash storage 608C, and hard-disk storage 610C. As described herein, these components may enable the server cluster 600 to provide the computation, virtualization, storage, and networking services.

More specifically, the hypervisors may enable the server cluster 600 to provide virtualization services. Each hypervisor may include software, firmware, and/or hardware that enable the hypervisor to execute and manage one or more respective virtual machines on a single physical host system (i.e., a server). The hardware may include one or more processors (e.g., single-core processors and/or multi-core processors), computer-usable memory (e.g., RAM and/or ROM), among other hardware. The software may implement a virtualization technique that enables the virtual machines to run on the host system simultaneously. For instance, as shown in FIG. 6, hypervisor 604A may execute virtual machines 612A, hypervisor 604B may execute virtual machines 612B, and hypervisor 604C may execute virtual machines 612C. In this arrangement, the operating systems of the virtual machines may share the hardware such that each virtual machine appears to have its own hardware. Accordingly, the virtual machines may effectively share the hardware resources (e.g., processor cycles, memory space, network bandwidth, etc.) of the respective hypervisor. In some examples, the hypervisor may also manage the hardware resources that are allocated to each virtual machine.

The data storage devices may enable the server cluster 600 to provide storage capabilities. In an implementation, the storage devices of the servers 602A, 602B, 602C may converge to deliver one or more unified pools of storage (also referred to herein as a "storage pools"). In this implementation, a storage pool may span a plurality of servers, and may be expanded to include the storage devices of servers that are later added to the server cluster 600. Additionally, a storage pool may implement a tiered storage structure and/or may be segmented into logical segments called "storage containers." Each storage container may be a defined subset of storage within the storage pool. In an example, the storage containers may have a 1-to-1 mapping with virtual machine datastores.

A storage pool may provide data storage to the virtual machines that are being executed by the server cluster 600. In order to access the storage pool, a virtual machine may interface with a controller of the server that is executing the virtual machine. As shown in FIG. 6, server 602A may include a controller 606A that may interface between the virtual machines 612A and the storage pool, server 602B may include a controller 606B that may interface between the virtual machines 612B and the storage pool, and server 602C may include a controller 606C that may interface between the virtual machines 612C and the storage pool.

In an implementation, a virtual machine may store data in the local storage devices of the server that is executing the virtual machine. Additionally, the data may be replicated in the storage devices of other servers to protect against hardware failure. To replicate the data, the data may be transferred between servers, perhaps via a network 614 (e.g., a local-area network) that communicatively couples the servers. In particular, the controllers of the servers may communicate with one another in order to exchange information (e.g., instructions, requests, data, etc.).

When a virtual machine submits a write request through its respective hypervisor, the request may be sent to the controller of the server that is executing the virtual machine. In order to provide a rapid response, the controller may store the data in local flash storage. The controller may then periodically transfer the stored data to the local hard-disk storage for longer-term storage. Additionally and/or alternatively, the controller may periodically transfer the data to other servers in the cluster for storage so that the data may be replicated in multiple nodes for higher data reliability and availability. The controllers of the other nodes may receive the data and may store the data in their respective local storage.

When a virtual machine submits a read request through the hypervisor, the request may be sent to the controller. The controller may search for a local copy of the requested data, and if present, may provide the hypervisor with the requested data. However, if the controller does not find a local copy, the controller may request the data from another node. Once the controller receives the data, the controller may provide the hypervisor with the requested data. Additionally, the controller may store the received data in local storage so that the data may be accessed more rapidly in the future.

VII. DISCOVERY PATTERN TO DISCOVER A SERVER CLUSTER

As described above, the remote network management platform 320 may discover configuration items present in the managed network 300. The remote network management platform 320 may periodically perform discovery in order to detect any new configuration items that have been added to the managed network 300 since the last discovery. Additionally, the remote network management platform 320, in a process referred to as "mapping," may generate a map that illustrates relationships between the discovered configuration items.

The remote network management platform 320 may use discovery and mapping to create and maintain an inventory of configuration items of the managed network 300. Such an inventory may provide clear and concise topology information of the managed network 300. This information may be used by the remote network management platform 320 to administer the devices, applications, and services of the managed network 300. Additionally, this information may be useful when determining how one configuration item may affect another. For instance, a comprehensive map may be used to determine an impact that a problematic configuration item may have on other configuration items.

In an embodiment, the managed network 300 may obtain service from a server cluster, such as the server cluster 600. The server cluster 600 may be disposed within the managed network 300 to provide the managed network 300 with services such as computation, virtualization, storage, and networking. When the managed network 300 includes the server cluster 600, it may be useful to discover and/or map the server cluster 600.

In an embodiment, the remote network management platform 320 may detect the server cluster 600 after performing an initial discovery (described above in FIG. 5A, 5B) that probes computing devices within managed network 300 according to one or more rule-based discovery patterns. Such probes may instruct the computing devices to identify software processes executing thereon. The software processes and the parameters associated therewith may be used to detect and/or identify the virtual machines of the server cluster 600. Alternatively or additionally, the one or more virtual machines may be discovered even when they are not being executed by, for example, scanning a file system of the server cluster 600 for files associated with the one or more virtual machines.

Performing the initial discovery may allow the remote network management platform 320 to detect the virtual machines that are being executed by the server cluster 600. Additionally, the initial discovery may detect the servers and the storage devices of the server cluster 600. The remote management network 320 may store, perhaps in CMDB 500, information indicative of the virtual machines as virtual machine data, information indicative of the discovered servers as server data, and information indicative of the discovered storage devices as storage device data. The virtual machine data may include an identifier (e.g., a name or Unique Identifier (UID)) for each virtual machine, identifiers of the servers that are executing the virtual machines, and performance data of the virtual machines. The server data may include an identifier (e.g., name or UID) for each server, the properties and specifications of each server, among other data. And the storage device data may include an identifier for each storage device (e.g., name or UID), a respective server identifier for each server that houses one of the storage devices, the properties and specifications of the storage devices, among other data. Additionally, the initial discovery may establish relationships between the discovered configuration items. For instance, the initial discovery may map each virtual machine to a corresponding server and may map each storage device to a corresponding server.

However, this initial discovery might not detect or determine additional information about the server cluster 600, such as information indicative of storage pools of the server cluster 600, information indicative of the relationships between the components of the server cluster 600, or information indicative of storage containers of the server cluster 600. However, determining such information may be desirable in order to fully discover the server cluster 600 and/or to generate a comprehensive map of the server cluster 600.

Disclosed herein is a server cluster discovery pattern for discovering and/or generating a comprehensive map of the server cluster 600. The server cluster discovery pattern may be stored and executed by a computational instance (e.g., computational instance 322) within the remote network management platform 320, a computing device (e.g., proxy servers 312) within the managed network 300, or a combination thereof. That is, functions of the server cluster discovery pattern may be distributed among different computing devices that form part of different computer networks.

In an embodiment, the remote network management platform 320 may initiate the server cluster discovery pattern after the initial discovery. During or after performing the initial discovery, the remote network management platform 320 may perform one or more additional discovery patterns in an attempt to classify the configuration items discovered by the initial discovery. For instance, the remote network management platform 320 may perform the server cluster discovery pattern in order to classify the discovered configuration items of the server cluster 600.

Figure 7:
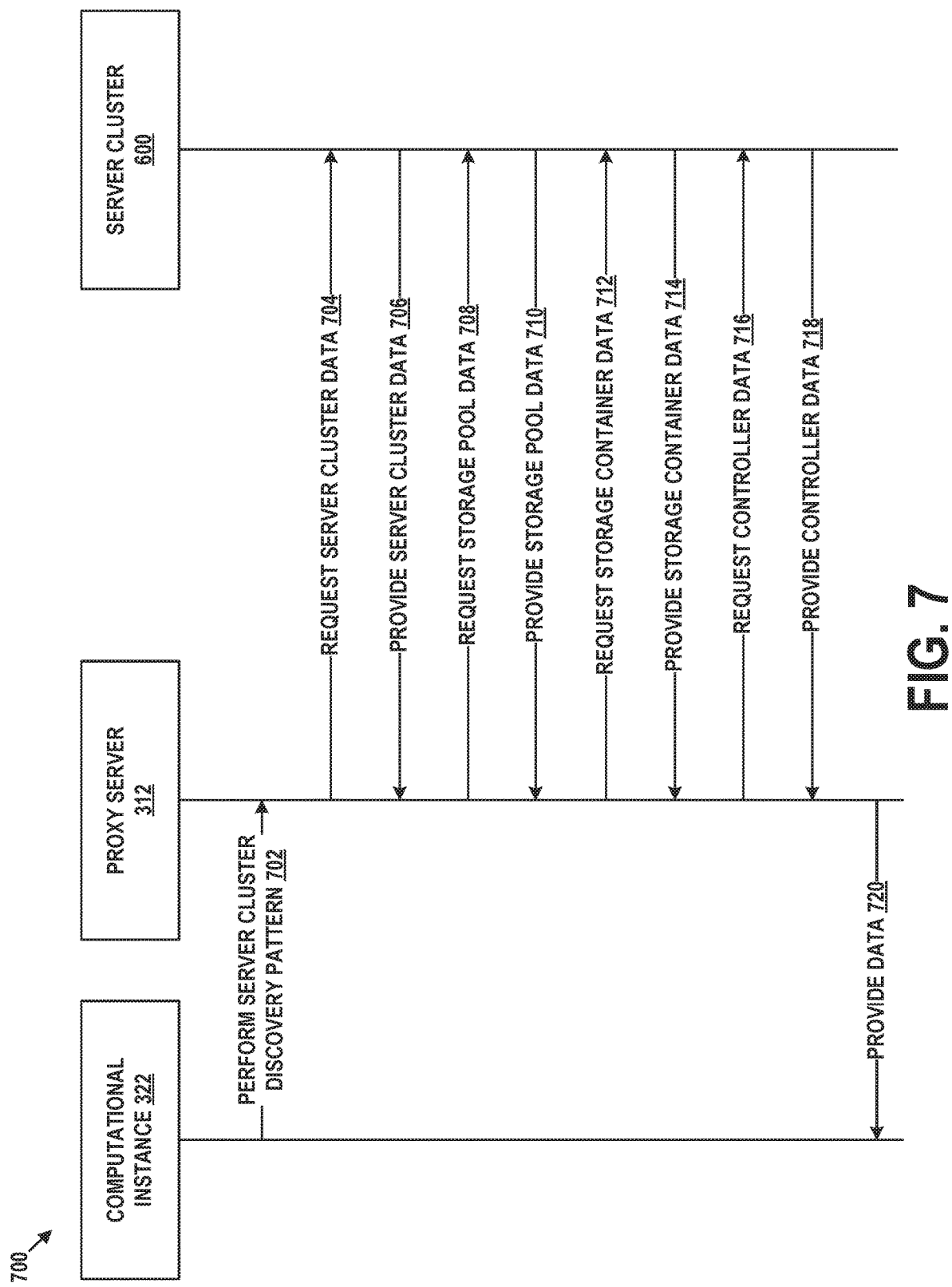
FIG. 7 is a messaging diagram, in accordance with example embodiments.

FIG. 7 depicts a message diagram 700 that illustrates steps of a server cluster discovery pattern, according to an example embodiment. As illustrated in FIG. 7, the steps of the server cluster discovery pattern may be carried out by the computational instance 322, proxy servers 312, and the server cluster 600. Unless specifically indicated, steps in the diagram 700 may be executed out of order from that shown or discussed, including substantially concurrent execution of separately described steps, or even in reverse order in some examples, depending on the functionality involved, so long as the overall functionality of the described pattern is maintained. Additionally, some requests and related responses may involve multiple transactions between the entities.

In step 702, the computational instance 322 may provide the proxy server 312 with an instruction to perform the server cluster discovery pattern. The computational instance 322 may provide the instruction in response to discovering configuration items associated with the server cluster 600. Specifically, various attributes and parameters of the discovered configuration items determined from software processes and/or files associated with the discovered configuration items may be used to select the server cluster discovery pattern. In some cases, these attributes and parameters may unambiguously identify the server cluster discovery pattern to be used for the configuration items.

For example, from information indicative of the discovered configuration items associated with the server cluster 600, the computational instance 322 may determine a type of the server cluster 600. The type of the server cluster 600 may be the type of architecture implemented by the cluster (e.g., a hyper-converged infrastructure) or may be a brand name of the cluster. The computational instance 322 may then provide the proxy server 312 with the instruction to perform a discovery pattern associated with the determined type of the server cluster 600. Here, the discovery pattern associated with the type of the server cluster 600 is the server cluster discovery pattern.

In response to receiving the instruction, the proxy server 312 may initiate the server cluster discovery pattern. As shown in FIG. 7, at least a portion of the server cluster discovery pattern may involve the proxy server 312 requesting and receiving data from the server cluster 600. In an implementation, the proxy servers 312 may request and receive data from one of the controllers 606A, 606B, and 606C of the server cluster 600. In an example, the requests from the proxy server 312 may be API requests to an API of the server cluster 600, such as a Representational State Transfer (REST) API.

As shown by step 704, the proxy server 312 may provide the server cluster 600 with a request for server cluster data. The server cluster data may include information indicative of the server cluster 600, such as a UID and a version of the server cluster 600. Other information in the server cluster data may include a domain, hypervisor types, and a number of nodes of the server cluster 600. In response to receiving the request, the server cluster 600 may provide the proxy server 312 with the server cluster data in step 706.

In step 708, the proxy server 312 may provide the server cluster 600 with a request for storage pool data. In an implementation, the proxy server 312 may first request and receive from the proxy server 312 a list of the storage pools of the server cluster 600. The proxy server 312 may then request respective storage pool data for each of the storage pools. In response to receiving the request, the server cluster 600 may provide the proxy server 312, in step 710, with the respective storage pool data.

Storage pool data may include information indicative of a storage pool, such as a name, available storage, used storage, information indicative of the servers (e.g., names or UIDs) that the storage pool is a part of, storage containers of the storage pool, and capacity. The name may indicate a name or UID of the storage pool, the available storage may indicate a total amount of physical storage space available in the storage pool, the used storage may indicate a total amount of physical storage space used in the storage pool, the information indicative of the servers may include names or UIDs of the one or more servers, the storage container data may include information (e.g., a name or UID) of the storage containers of the storage pool, and the capacity may indicate a total physical storage space capacity in the storage pool.

In step 712, the proxy server 312 may provide the server cluster 600 with a request for storage container data of the storage containers associated with each of the discovered storage pools. In response to receiving the request, the server cluster 600 may provide the proxy server 312, in step 714, with respective container data for each storage container. The container data may include a name of the container, a UID of the container, free storage space in the container, used storage space in the container, max storage capacity of the container, total reserved storage capacity, replication factor (e.g., a number of maintained data copies of data stored in the container, such as 2 or 3), compression, compression delay, compression space saved, disk duplication state (e.g., enabled or not enabled), erasure coding, information indicative of the storage pool (e.g., name or UID) that the storage container is a part of, among other data.

In step 716, the proxy server 312 may provide the server cluster 600 with a request for respective controller data of each controller of each server. In response to receiving the request, the server cluster 600 may provide the server proxy 312, in step 718, with the respective controller data. The controller data may include a given name of a controller, information indicative of a server (e.g., a name or UID) that is executing the controller, a host IP address, an operating system of the controller, an amount of memory available to the controller, an amount of memory reserved for the controller, an amount of dynamic memory currently assigned to the controller, a number of CPU cores being used by the controller, an amount of CPU power reserved for the controller, a total disk capacity available to the controller, an IP address assigned to the controller, among other data. In some examples, the host IP address and the IP address assigned to the controller may be the same, and in other examples, they may be different.

Once the proxy server 312 receives the controller data, the proxy server 312, in step 720, may provide the computational instance 322 with some or all of the data received from the server cluster 600. Alternatively, the proxy server 312 may provide each data set upon receipt of the data from the server cluster 600 (as opposed to sending the data collectively once all of the data is received from the server cluster 600).

The computational instance 322 may store the received data in a storage device, perhaps CMDB 500. For instance, the data may be stored in database tables, each of which may be associated with a respective type of configuration item. The database tables may list discovered configuration items of a particular type and any determined properties thereof. For example, a database table may be associated with a "server" type of configuration item. Such a table may list the discovered servers and any determined properties thereof.

Additionally, the computational instance 322 may determine the dependencies and relationships between the discovered configuration items. In an embodiment, the computational instance 322 may do so using the data received from the server cluster 600. For example, the computational instance 322 may extract, from the data, identifying information indicative of the configuration items and may cross-reference the identifying information in order to determine the relationships between the configuration items. The computational instance 322 may then use these relationships to determine a hierarchy of the configuration items.

To illustrate this process, consider the server cluster 600. From server cluster data indicative of the server cluster 600, the computational instance 322 may determine an identifier of the server cluster 600 (e.g., a name or UID). Additionally, the computational instance 322 may determine, from the server data of the discovered servers, a respective identifier of a respective server cluster to which each server corresponds (if any). The computational instance 322 may then cross-reference each respective identifier with the identifier of the server cluster 600 (that was determined from the server cluster data). The computational instance 322 may determine that the servers whose respective server cluster identifier matches the identifier of the server cluster 600 are part of the server cluster 600. As such, by cross-referencing the identifier of the server cluster 600 from server cluster data with server cluster identifiers from the server data, the computational instance 322 may determine the relationship between the discovered servers and the server cluster 600 (e.g., that the servers are nodes of the server cluster 600).

Similarly, the computational instance 322 may cross-reference storage device identifiers from storage device data and storage pool data to establish a relationship between the storage devices and the storage pools. By doing so, the computational instance 322 may map each storage pool to one or more corresponding storage devices on which the storage pool is stored. The computational instance 322 may also cross-reference storage pool identifiers from storage pool data and storage container data to establish a relationship between the storage pools and the storage containers. By doing so, the computational instance 322 may map each storage container to a particular storage pool to which the storage container corresponds. Further, the computational instance 322 may cross-reference server identifiers from controller data and server data to determine a relationship between the controller virtual machines and the servers. By doing so, the computational instance may map each controller virtual machine to a corresponding server that executes the virtual machine. Yet further, the computational instance 322 may cross-reference server identifiers from controller data and virtual machine data to determine a relationship between the controller virtual machines and the virtual machines. By doing so, the computational instance may map each controller virtual machine to a corresponding group of virtual machines that are being executed by the same server as the controller virtual machine.

Figure 8A:
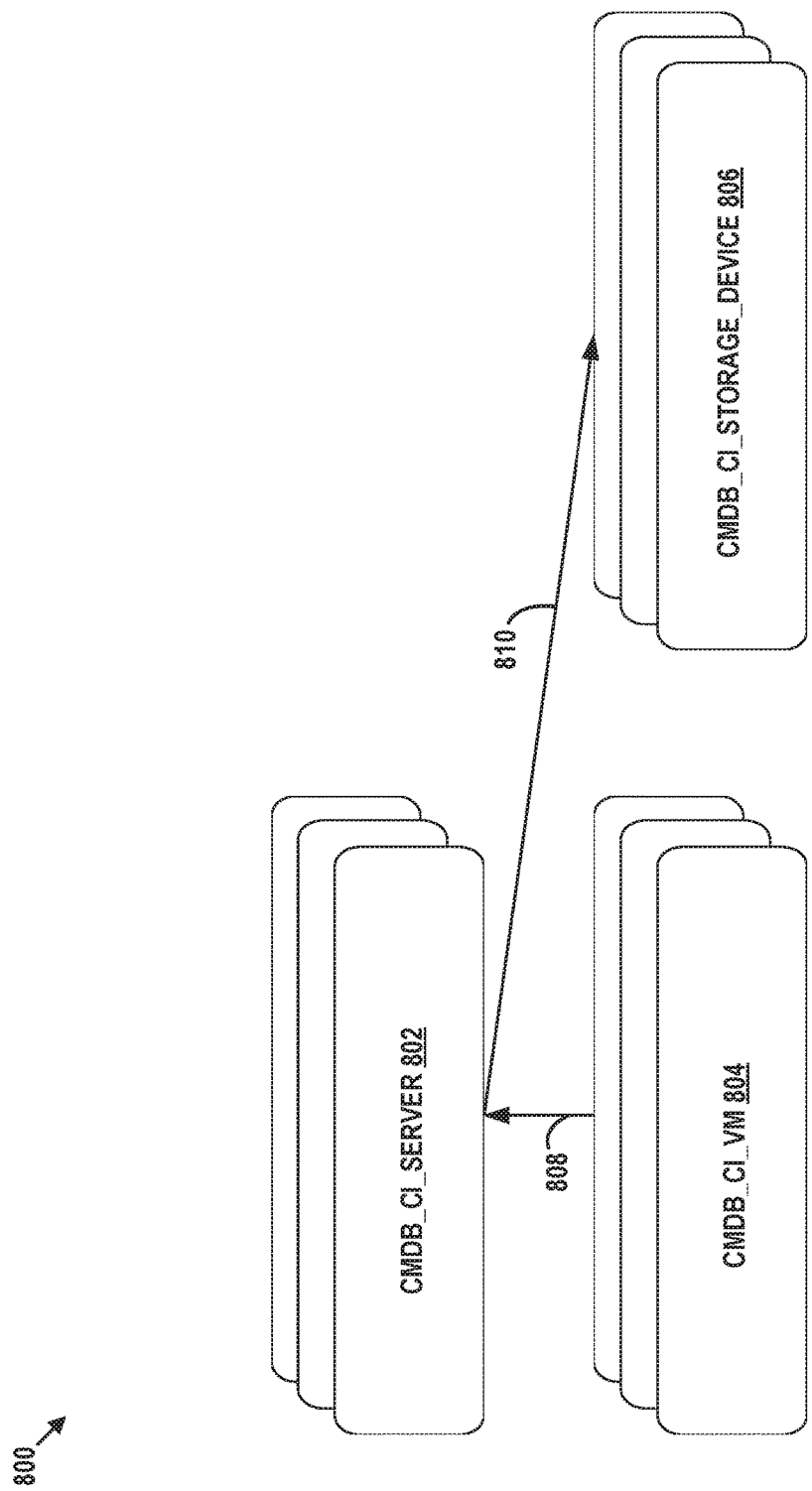
FIG. 8A is a representation of configuration items discovered by initial discovery, in accordance with example embodiments.
Figure 8B:
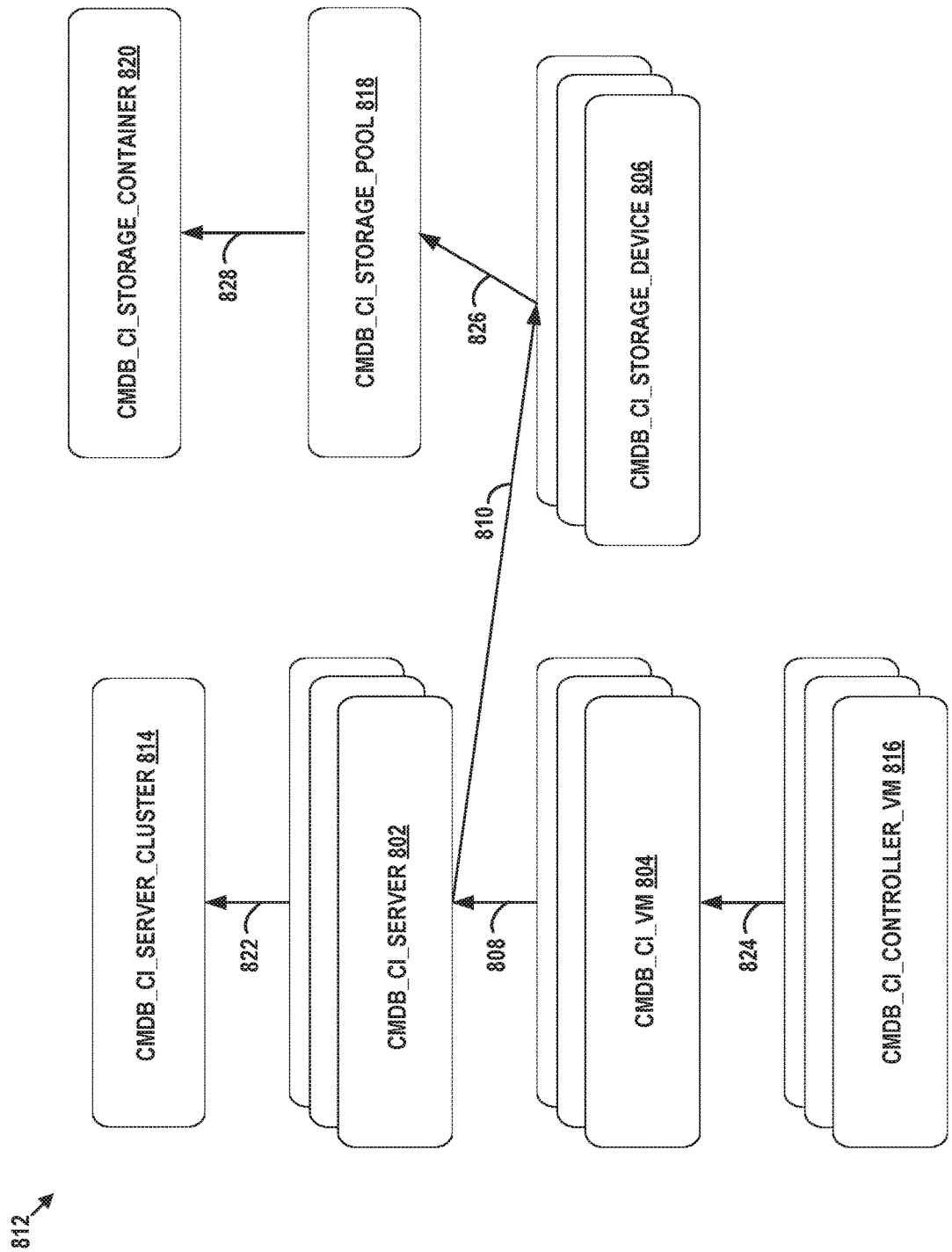
FIG. 8B is a representation of configuration items discovered by a computing cluster discovery pattern, in accordance with example embodiments.

FIGS. 8A and 8B illustrate representations of the relationships that the computational instance 322 may establish between discovered configuration items, according to example embodiments.

As described above, an initial discovery may discover the servers of the server cluster 600, the virtual machines that are being executed by the servers, and/or the storage devices of the servers. Data indicative of these discovered configuration items may be stored in tables, where each table may include information indicative of a particular type of configuration item. For instance, a "server" table may list the discovered servers, a "virtual machine" table may list the virtual machines that are being executed by a respective server, and a "storage device" table may list the storage devices that are included in a respective server. Furthermore, the tables may map to one another, thereby representing the relationships between the configuration items.

FIG. 8A depicts a representation 800 of the configuration items discovered by the initial discovery. In this representation, "CMDB CI SERVER" 802 may represent a table that lists the servers that are included in the server cluster 600, "CMDB_CI_VM" 804 may represent the tables that list the virtual machines that are being executed by the servers, and "CMDB_CI_STORAGE_DEVICE" 806 may represent the tables that list the storage devices of the servers. Additionally, FIG. 8A depicts the relationships between the configuration items by arrows 808 and 810. Arrow 808 is indicative of the relationship between the virtual machines and the servers (e.g., that the virtual machines are being executed by the servers), and arrow 810 is indicative of the relationship between the storage devices and the servers (e.g., that the storage devices are part of the servers). Additionally, each configuration item listed in a table may map to a corresponding configuration item in another table. For example, a virtual machine in the virtual machines table may point to the server, in the server table, that executes the virtual machine.

As described above, the server cluster discovery pattern may discover one or more additional configuration items of the server cluster 600, perhaps after the initial discovery has been completed. Data indicative of the additionally discovered configuration items may be stored in tables. For instance, a "controller virtual machine" table may list the controllers of the servers, a "storage pool" table may list storage pools of the server cluster, a "storage container" table may list the storage containers of a respective storage pool, and a "server cluster" table may list an identifier of the server cluster. In addition to listing the different configuration items in each table, the tables may also include discovered properties of the configuration items. Furthermore, the relationships between the configuration items may be stored as relationships between the stored tables.

FIG. 8B illustrates a representation 812 that is an updated version of the representation 800. In addition to the tables of representation 800, the representation 812 also depicts the tables that are generated by server cluster discovery pattern. As shown in FIG. 8B, "CMDB_CI_CONTROLLER_VM" 816 may represent a table that lists the controller virtual machines of the servers, "CMDB_CI_STORAGE_POOL" 818 may represent a table that lists the storage pools of the server cluster 600, and "CMDB_CI_STORAGE_CONTAINER" 820 may represent table that list the storage containers of each storage pool.

Like in the representation 800, the relationships between the configuration items may be represented by arrows. More specifically, arrow 822 may indicate that the servers listed in table 802 are part of the server cluster listed in table 814. Furthermore, arrow 824 may indicate that the controller virtual machines are a subset of the virtual machines that are being executed by the servers listed in table 802. Further, arrow 826 may indicate that the storage pools are stored in the storage devices that are listed in table 806. Yet further, arrow 828 may indicate that storage containers listed in table 820 are part of the storage pools listed in table 818.

In an embodiment, the computational instance 322 may also graphically represent the information that is stored in the tables of the representation 812. The computational instance 322 may do so to allow the user to view the hardware composition and operational status of configuration items of the server cluster 600. For example, after discovering the server cluster 600, the computational instance may generate a graphical representation of the components of the server cluster 600 (as shown in FIG. 6) and may provide the graphical representation to the user, perhaps by way of a graphical user interface.

Figure 9A:
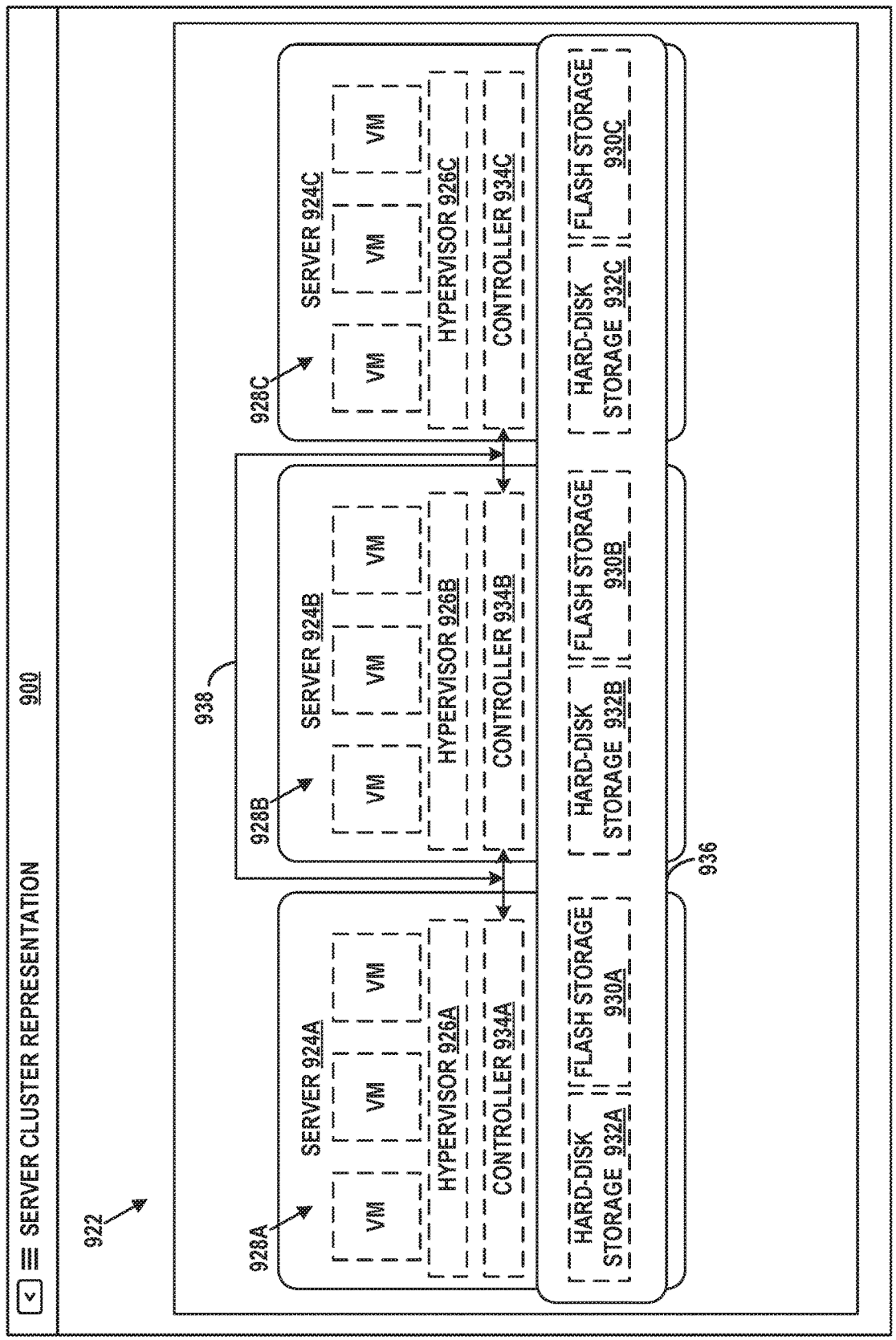
FIGS. 9A and 9B are graphical user interfaces for displaying representations of a computing cluster, in accordance with example embodiments.

FIG. 9A illustrates graphical user interface 900 that includes a graphical representation 922 of the server cluster 600, according to an example embodiment. The graphical representation 922 may be created based on the data generated during the discovery of the server cluster 600. In particular, the graphical representation 922 may mirror the infrastructure representation of the server cluster as depicted in FIG. 6.

Like the representation in FIG. 6, the graphical representation 922 may depict each server of the server cluster and the components thereof. As shown in FIG. 9A, the graphical representation may depict servers 924A, 924B, and 924C of the discovered server cluster. For example, if the discovered server cluster is the server cluster 600, the servers 924A, 924B, 924C may represent servers 602A, 602B, 602C, respectively (as shown in FIG. 6). Additionally, the graphical representation 922 may depict the configuration items of each server. As shown in FIG. 9A, the server 924A may include hypervisor 926A that executes virtual machines 928A. Additionally, the server 924A may include flash storage 930A, hard-disk storage 932A, and controller 934A. Similarly, the graphical representation 922 may depict hypervisor 926B that includes virtual machines 928B, flash storage 930B, hard-disk storage 932B, and controller 934B of server 924B; and hypervisor 926C that includes virtual machines 928C, flash storage 930C, hard-disk storage 932C, and controller 934C of server 924C.

Additionally, the graphical representation 922 may depict a storage pool 936 of the server cluster 600. As shown in FIG. 9A, the storage pool may be part of several storage devices across a plurality of servers. The graphical representation 922 may also depict connection 938, which may represent that the servers 924A, 924B, 924C are communicatively coupled to one other, perhaps by way of their respective controllers.

In an embodiment, the graphical user interface 900 may allow a user to interact with the map 922. For example, in addition to allowing the user to view the graphical representation 922, the graphical user interface 902 may also receive an input from the user. The user input may allow the user to view additional information associated with one or more of the configuration items, modify the properties of one or more of the configuration items, and/or provide other inputs and instructions.

Furthermore, the graphical representation 922 is merely one example of the graphical representations that may be generated from the data generated during discovery of the server cluster 600. As another example, a hierarchical representation of the components of the server cluster 600 may be generated based on the generated data.

Figure 9B:
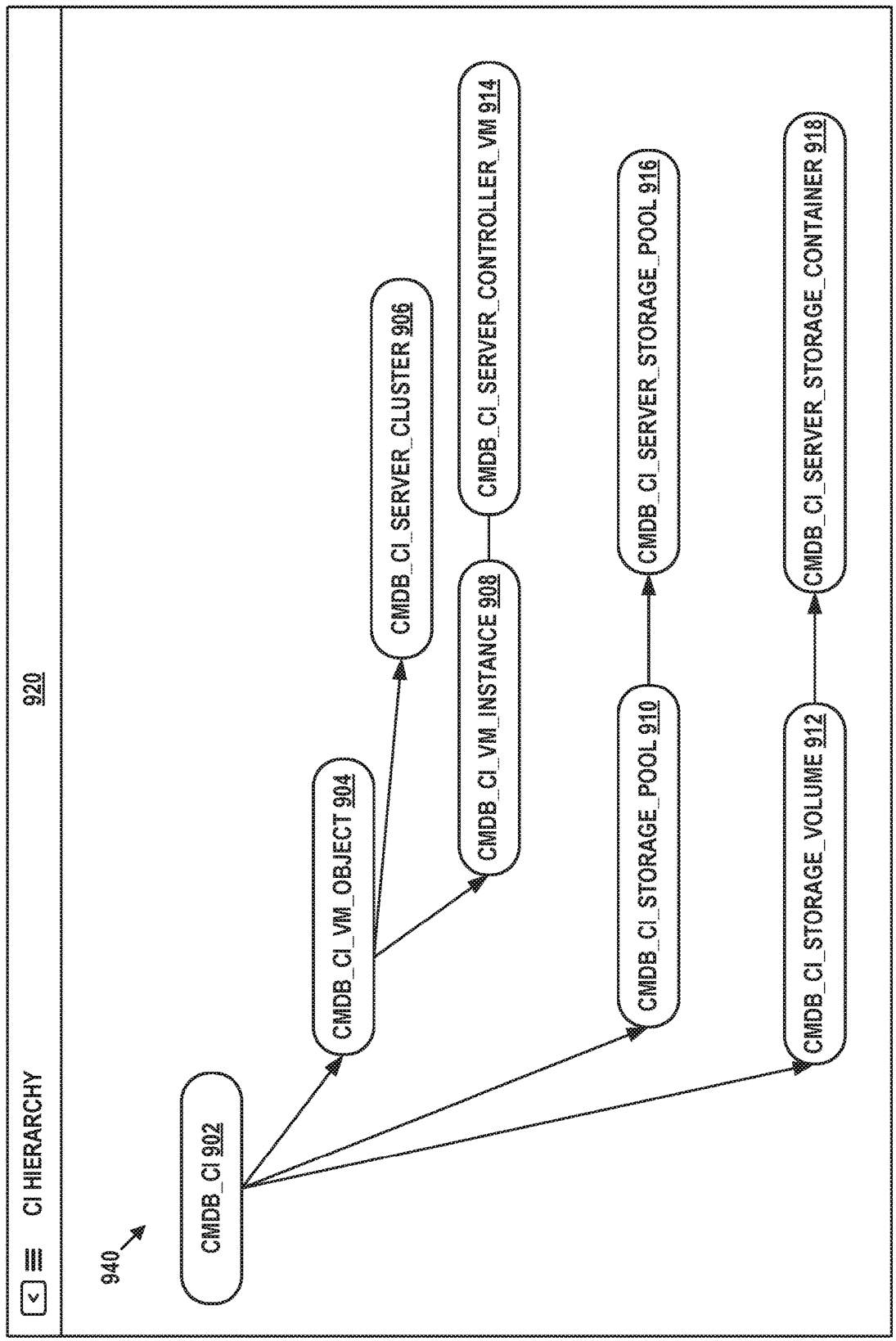

FIG. 9B illustrates graphical user interface 920 that includes a hierarchical representation 940 of configuration items of a server cluster 600, according to an example embodiment. As shown in FIG. 9B, the broadest category in the representation is a category "CMDB_CI" 902 that includes all configuration items of a managed network. This category 902 may include three subcategories that are relevant to the server cluster 600: "CMDB_CI_VM_OBJECT" 904, "CMDB_CI_STORAGE_POOL" 910, and "CMDB_CI_STORAGE_VOLUME" 912.

The category "CMDB_CI_VM_OBJECT" 904 includes all of the virtual machine objects in the managed network and includes two subcategories relevant to the server cluster 600: "CMDB_CI_SERVER_CLUSTER" 906 and "CMDB_CI_VM_INSTANCE" 908. The subcategory 906 may include the server clusters that are disposed in the managed network. The subcategory 908 may include a subcategory "CMDB_CI_SERVER_CONTROLLER_VM" 914 that includes the controllers of the server clusters included in subcategory 906.

The category 910 may include a subcategory that is related to the server cluster 600. This subcategory, labelled "CMDB_CI_SERVER_STORAGE_POOL" 916, includes the storage pools of the servers included in subcategory 906. Furthermore, the category 912 may include a subcategory that is related to the server cluster 600. This subcategory, labelled "CMDB_CI_SERVER_STORAGE_CONTAINER" 918, may include the storage containers of the server clusters included in the subcategory 906.

VIII. EXAMPLE OPERATIONS

Figure 10:
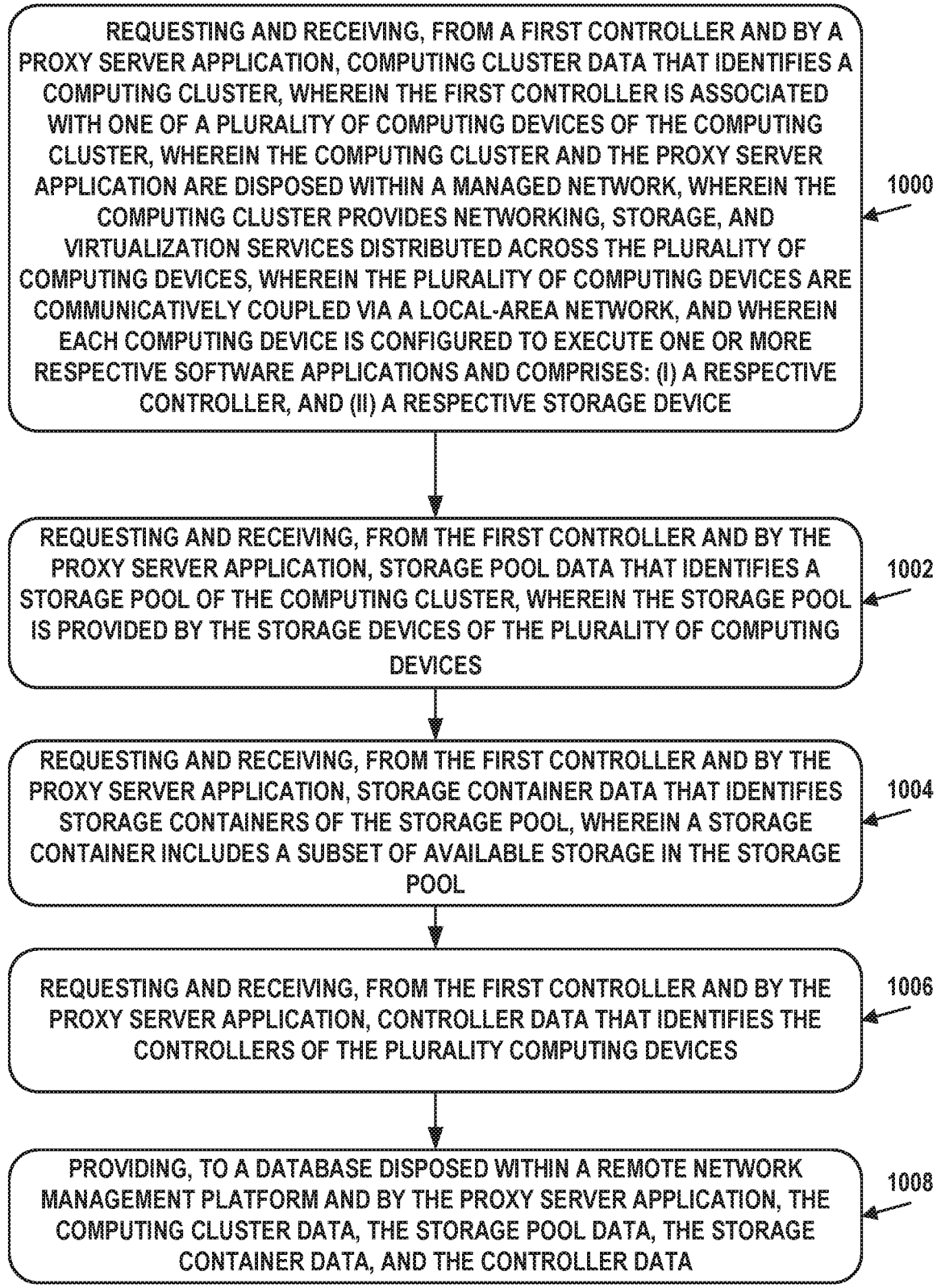
FIG. 10 is a flow chart, in accordance with example embodiments.

FIG. 10 is a flow chart illustrating an example embodiment. The process illustrated by FIG. 10 may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device.

The embodiments of FIG. 10 may be simplified by the removal of any one or more of the features shown therein. Further, these embodiments may be combined with features, aspects, and/or implementations of any of the previous figures or otherwise described herein.

Block 1000 may involve requesting and receiving, from a first controller and by a proxy server application, computing cluster data that identifies a computing cluster, wherein the first controller is associated with one of a plurality of computing devices of the computing cluster, wherein the computing cluster and the proxy server application are disposed within a managed network, wherein the computing cluster provides networking, storage, and virtualization services distributed across the plurality of computing devices, wherein the plurality of computing devices are communicatively coupled via a local-area network, and wherein each computing device is configured to execute one or more respective software applications and comprises: (i) a respective controller, and (ii) a respective storage device.

Block 1002 may involve requesting and receiving, from the first controller and by the proxy server application, storage pool data that identifies a storage pool of the computing cluster, wherein the storage pool is provided by the storage devices of the plurality of computing devices.

Block 1004 may involve requesting and receiving, from the first controller and by the proxy server application, storage pool data that identifies a storage pool of the computing cluster, wherein the storage pool is provided by the storage devices of the plurality of computing devices.

Block 1006 may involve requesting and receiving, from the first controller and by the proxy server application, controller data that identifies the controllers of the plurality computing devices.

Block 1008 may involve providing, to a database disposed within a remote network management platform and by the proxy server application, the computing cluster data, the storage pool data, the storage container data, and the controller data.

In some embodiments, a proxy server application disposed in a managed network may carry out the process of blocks 1100-1108.

In some embodiments, the database may store: (i) software application data that identifies software applications that are executed by the plurality of computing devices, (ii) computing device data that identifies the plurality of computing devices, and (iii) storage device data that identifies the storage devices of the plurality of computing devices.

In some embodiments, the software application data, the computing device data, and the storage device data may be determined by an initial discovery performed by the proxy server application.

In some embodiments, the remote network management platform may include a server device configured to, based on the software application data, the computing device data, and the storage device data, map each software application to a corresponding computing device that executes the software application and each storage device to a corresponding computing device that houses the storage device.

In some embodiments, the remote network management platform may include a server device configured to: use the software application data to determine a type of the computing cluster; based on the type of the computing cluster, select the computing cluster discovery pattern to discover the computing cluster; and responsive to selecting the computing cluster discovery pattern, send an instruction to the proxy server application to perform the operations of the computing cluster discovery pattern.

In some embodiments, the remote network management platform may include a server device configured to, based on the computing cluster data, the storage pool data, the storage container data, and the controller data, generating a hierarchical representation of the computing cluster, wherein the hierarchical representation is indicative of relationships between components of the computing cluster.

In some embodiments, generating a hierarchical representation of the computing cluster may involve: mapping the plurality of computing devices to the computing cluster; mapping the storage pool to the storage devices; mapping the storage containers to the storage pool; and mapping each respective controller to a corresponding computing device associated with the respective controller.

In some embodiments, mapping the plurality of computing devices to the computing cluster may involve: determining, from the computing cluster data, a first computing cluster unique identifier (UID) that identifies the computing cluster; determining, from computing device data stored in the database, a second computing cluster UID that identifies a particular computing cluster associated with the plurality of computing devices; determining that the first computing cluster UID and the second computing cluster UID are identical; and responsively mapping the plurality of computing devices to the computing cluster.

In some embodiments, mapping the storage pool to the storage devices may involve: determining, from the storage pool data, a first storage device unique identifier (UID) of a particular storage device associated with the storage pool; determining, from storage device data stored in the database, a second storage device UID that identifies a storage device of the computing cluster; determining that the first storage device UID and the second storage device UID are identical; and responsively mapping the storage pool to the storage device.

In some embodiments, mapping the storage containers to the storage pool may involve: determining, from the storage pool data, a first storage pool unique identifier (UID) that identifies the storage pool; determining, from the storage container data, a second storage pool UID of a particular storage pool associated with the storage containers; determining that the first storage pool UID and the second storage pool UID are identical; and responsively mapping the storage containers to the storage pool.

In some embodiments, mapping each respective controller to a corresponding computing device that is associated with the respective controller may involve: determining, from the controller data, a first computing device unique identifier (UID) of a particular computing device that is associated with the respective controller; determining, from computing device data stored in the database, a second respective computing device UID for each of the plurality of computing devices; selecting from the plurality of computing devices a first computing device whose second respective computing device UID is identical to the first computing device UID; and mapping the respective storage device to the particular computing device.

IX. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A system comprising:
a database disposed within a remote network management platform that is associated with a managed network, wherein the managed network comprises a computing cluster that provides networking, storage, and virtualization services distributed across each of a plurality of computing devices that are communicatively coupled via a local-area network, wherein each computing device is configured to execute one or more respective software applications and comprises: (i) a respective controller, and (ii) a respective storage device, and wherein the storage devices of the plurality of computing devices collectively form a storage pool for the computing cluster; and
a proxy server application disposed within the managed network and configured to perform operations of a computing cluster discovery pattern, the operations comprising:
requesting and receiving, from a first controller of one of the plurality of computing devices, computing cluster data that identifies the computing cluster;
requesting and receiving, from the first controller, storage pool data that identifies the storage pool;
requesting and receiving, from the first controller, storage container data that identifies storage containers of the storage pool, wherein a storage container includes a subset of available storage in the storage pool;
requesting and receiving, from the first controller, controller data that identifies the controllers of the plurality computing devices; and
providing, to the database, the computing cluster data, the storage pool data, the storage container data, and the controller data.

2. The system of claim 1, wherein the database stores: (i) software application data that identifies software applications that are executed by the plurality of computing devices, (ii) computing device data that identifies the plurality of computing devices, and (iii) storage device data that identifies the storage devices of the plurality of computing devices.

3. The system of claim 2, wherein the software application data, the computing device data, and the storage device data are determined by an initial discovery performed by the proxy server application.

4. The system of claim 2, further comprising:
a server device disposed within the remote network management platform and configured to, based on the software application data, the computing device data, and the storage device data, map each software application to a corresponding computing device that executes the software application and each storage device to a corresponding computing device that houses the storage device.

5. The system of claim 2, further comprising:
a server device disposed within the remote network management platform and configured to:
use the software application data to determine a type of the computing cluster;
based on the type of the computing cluster, select the computing cluster discovery pattern to discover the computing cluster; and
responsive to selecting the computing cluster discovery pattern, send an instruction to the proxy server application to perform the operations of the computing cluster discovery pattern.

6. The system of claim 1, further comprising:
a server device disposed within the remote network management platform and configured to, based on the computing cluster data, the storage pool data, the storage container data, and the controller data, generating a hierarchical representation of the computing cluster, wherein the hierarchical representation is indicative of relationships between components of the computing cluster.

7. The system of claim 6, wherein generating the hierarchical representation of the computing cluster comprises:
mapping the plurality of computing devices to the computing cluster;
mapping the storage pool to the storage devices;
mapping the storage containers to the storage pool; and
mapping each respective controller to a corresponding computing device associated with the respective controller.

8. The system of claim 7, wherein mapping the plurality of computing devices to the computing cluster comprises:
determining, from the computing cluster data, a first computing cluster unique identifier (UID) that identifies the computing cluster;
determining, from computing device data stored in the database, a second computing cluster UID that identifies a particular computing cluster associated with the plurality of computing devices;
determining that the first computing cluster UID and the second computing cluster UID are identical; and
responsively mapping the plurality of computing devices to the computing cluster.

9. The system of claim 7, wherein mapping the storage pool to the storage devices comprises:
determining, from the storage pool data, a first storage device unique identifier (UID) of a particular storage device associated with the storage pool;
determining, from storage device data stored in the database, a second storage device UID that identifies a storage device of the computing cluster;
determining that the first storage device UID and the second storage device UID are identical; and
responsively mapping the storage pool to the storage device.

10. The system of claim 7, wherein mapping the storage containers to the storage pool comprises:
determining, from the storage pool data, a first storage pool unique identifier (UID) that identifies the storage pool;
determining, from the storage container data, a second storage pool UID of a particular storage pool associated with the storage containers;
determining that the first storage pool UID and the second storage pool UID are identical; and
responsively mapping the storage containers to the storage pool.

11. The system of claim 7, wherein mapping each respective controller to a corresponding computing device that is associated with the respective controller comprises:
determining, from the controller data, a first computing device unique identifier (UID) of a particular computing device that is associated with the respective controller;
determining, from computing device data stored in the database, a second respective computing device UID for each of the plurality of computing devices;
selecting from the plurality of computing devices a first computing device whose second respective computing device UID is identical to the first computing device UID; and
mapping the respective storage device to the particular computing device.

12. A method comprising:
requesting and receiving, from a first controller and by a proxy server application, computing cluster data that identifies a computing cluster, wherein the first controller is associated with one of a plurality of computing devices of the computing cluster, wherein the computing cluster and the proxy server application are disposed within a managed network, wherein the computing cluster provides networking, storage, and virtualization services distributed across the plurality of computing devices, wherein the plurality of computing devices are communicatively coupled via a local-area network, and wherein each computing device is configured to execute one or more respective software applications and comprises: (i) a respective controller, and (ii) a respective storage device;
requesting and receiving, from the first controller and by the proxy server application, storage pool data that identifies a storage pool of the computing cluster, wherein the storage pool is provided by the storage devices of the plurality of computing devices;
requesting and receiving, from the first controller and by the proxy server application, storage container data that identifies storage containers of the storage pool, wherein a storage container includes a subset of available storage in the storage pool;
requesting and receiving, from the first controller and by the proxy server application, controller data that identifies the controllers of the plurality computing devices; and
providing, to a database disposed within a remote network management platform and by the proxy server application, the computing cluster data, the storage pool data, the storage container data, and the controller data.

13. The method of claim 12, further comprising:
based on the computing cluster data, the storage pool data, the storage container data, and the controller data, generating a hierarchical representation of the computing cluster, wherein the hierarchical representation is indicative of relationships between components of the computing cluster.

14. The method of claim 13, wherein generating the hierarchical representation of the computing cluster comprises:
mapping the plurality of computing devices to the computing cluster;
mapping the storage pool to the storage devices;
mapping the storage containers to the storage pool; and
mapping the respective controller to a corresponding computing device that executes the respective controller.

15. The method of claim 14, wherein mapping the plurality of computing devices to the computing cluster comprises:
determining, from the computing cluster data, a first computing cluster unique identifier (UID) that identifies the computing cluster;
determining, from computing device data stored in the database, a second computing cluster UID that identifies a particular computing cluster associated with the plurality of computing devices;
determining that the first computing cluster UID and the second computing cluster UID are identical; and
responsively mapping the plurality of computing devices to the computing cluster.

16. The method of claim 14, wherein mapping the storage pool to the storage devices comprises:
determining, from the storage pool data, a first storage device unique identifier (UID) of a particular storage device associated with the storage pool;
determining, from storage device data stored in the database, second storage device UID that identifies a storage device of the computing cluster;
determining that the first storage device UID and the second storage device UID are identical; and
responsively mapping the storage pool to the storage device.

17. The method of claim 14, wherein mapping the storage containers to the storage pool comprises:
determining, from the storage pool data, a first storage pool unique identifier (UID) that identifies the storage pool;
determining, from the storage container data, a second storage pool UID of a particular storage pool associated with the storage containers;
determining that the first storage pool UID is identical to the second storage pool UID; and
responsively mapping the storage containers to the storage pool.

18. The method of claim 14, wherein mapping each respective controller to a corresponding computing device that is associated with the respective controller comprises:
determining, from the controller data, a first computing device unique identifier (UID) of a particular computing device that is associated with the respective controller;
determining, from computing device data stored in the database, a second respective computing device UID for each of the plurality of computing devices;
selecting from the plurality of computing devices a first computing device whose second respective computing device UID is identical to the first computing device UID; and
mapping the respective storage device to the first computing device.

19. An article of manufacture including a non-transitory computer-readable medium, having stored thereon program instructions that, upon execution by a proxy server application disposed within a managed network, cause the proxy server application to perform operations comprising:
requesting and receiving, from a first controller, computing cluster data that identifies a computing cluster, wherein the first controller is associated with one of a plurality of computing devices of the computing cluster, wherein the computing cluster is disposed within the managed network, wherein the computing cluster provides networking, storage, and virtualization services distributed across the plurality of computing devices, wherein the plurality of computing devices are communicatively coupled via a local-area network, and wherein each computing device is configured to execute one or more respective software applications and comprises: (i) a respective controller, and (ii) a respective storage device, and
requesting and receiving, from the first controller, storage pool data that identifies a storage pool of the computing cluster, wherein the storage pool is provided by the storage devices of the plurality of computing devices;
requesting and receiving, from the first controller, storage container data that identifies storage containers of the storage pool, wherein a storage container includes a subset of available storage in the storage pool;
requesting and receiving, from the first controller, controller data that identifies the controllers of the plurality computing devices; and
providing, to a database disposed within a remote network management platform, the computing cluster data, the storage pool data, the storage container data, and the controller data.

20. The article of manufacture of claim 19, wherein the database stores: (i) software application data that identifies software applications that are executed by the plurality of computing devices, (ii) computing device data that identifies the plurality of computing devices, and (iii) storage device data that identifies the storage devices of the plurality of computing devices.

* * * * *